United States Patent
Griffin et al.

(10) Patent No.: US 10,364,860 B2
(45) Date of Patent: Jul. 30, 2019

(54) SYSTEMS AND METHODS FOR DAMPENING DYNAMIC LOADING

(71) Applicant: The Boeing Company, Chicago, IL (US)

(72) Inventors: Steven F. Griffin, Kihei, HI (US); Richard W. Aston, Brea, CA (US); Jazzmin P. Martinez, Los Angeles, CA (US); Michael John Langmack, Hungtington Beach, CA (US); Christopher R. Shurilla, Kihei, HI (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/836,131

(22) Filed: Dec. 8, 2017

(65) Prior Publication Data
US 2019/0178325 A1    Jun. 13, 2019

(51) Int. Cl.
*F16F 15/03*    (2006.01)
*F16F 6/00*    (2006.01)
(Continued)

(52) U.S. Cl.
CPC ............ *F16F 6/005* (2013.01); *B60G 99/006* (2013.01); *F16F 15/005* (2013.01); *F16F 15/121* (2013.01)

(58) Field of Classification Search
CPC .......... F16F 6/005; F16F 15/005; F16F 15/03; F16F 15/035; F16F 15/121; B60G 99/006; B60G 2202/16
(Continued)

(56) References Cited

U.S. PATENT DOCUMENTS 2,636,139 A * 4/1953 Winget ................... F16F 15/18
                                                        310/105
2,906,899 A * 9/1959 Geneslay .................. H01F 7/02
                                                        188/267
(Continued)

FOREIGN PATENT DOCUMENTS

DE    102008048210 A1    5/2010
FR        2995561 A1    3/2014
(Continued)

OTHER PUBLICATIONS

Lenz's Law: Magnet Falling Through a Copper Tube or Pipe, http://www.waynesthisandthat.com/Lenz's%20Law%20Magnet%20Falling%20Through%20a%20Copper%20Tube%20or%20Pipe.html, 10 pages, printed from the World Wide Web on Dec. 5, 2017.
(Continued)

*Primary Examiner* — Thomas W Irvin
(74) *Attorney, Agent, or Firm* — McDonnell Boehnen Hulbert & Berghoff LLP

(57) ABSTRACT

Systems and methods for dampening dynamic loading between two bodies are described. An example dampening system includes a non-ferrous metal body attached to a second body and a stack of magnets attached to a third body. The stack of magnets is movably disposed within or around the non-ferrous metal body, and adjacent magnets are arranged in an opposed polar relationship, whereby relative movement of said second and third bodies is damped. An example method of dampening dynamic loading includes arranging a plurality of magnets along an axis to form at least one pair of magnets having an opposed polar relationship along the axis. The method further includes axially moving the at least one pair of magnets relative to a non-ferrous metal body, so as to dampen dynamic loading of a payload attached to a vehicle.

18 Claims, 7 Drawing Sheets

(51) Int. Cl.
*B60G 99/00* (2010.01)
*F16F 15/121* (2006.01)
*F16F 15/00* (2006.01)

(58) Field of Classification Search
USPC .......................................... 188/267, 322.12
See application file for complete search history.

(56) References Cited

U.S. PATENT DOCUMENTS

| | | | | |
|---|---|---|---|---|
| 4,892,328 A * | 1/1990 | Kurtzman | .......... | B60G 17/0157 188/267 |
| 5,392,881 A * | 2/1995 | Cho | .................... | F16F 15/035 188/267 |
| 5,445,249 A * | 8/1995 | Aida | ....................... | F16F 7/10 188/267 |
| 5,454,550 A * | 10/1995 | Christopherson | .... | B60G 15/062 188/322.12 |
| 5,542,506 A * | 8/1996 | McMichael | ......... | F16C 32/0438 188/267 |
| 5,878,851 A * | 3/1999 | Carlson | .................. | F16F 9/067 188/267 |
| 6,202,806 B1 * | 3/2001 | Sandrin | .............. | A63B 21/0056 188/267 |
| 6,340,080 B1 * | 1/2002 | Carlson | .............. | A63B 21/0056 188/267 |
| 6,952,060 B2 * | 10/2005 | Goldner | ............. | B60G 17/0157 310/12.13 |
| 7,051,849 B2 * | 5/2006 | Browne | ................. | F16F 9/535 188/266.4 |
| 8,322,497 B2 * | 12/2012 | Marjoram | ............ | B60G 99/002 188/267 |
| 8,941,251 B2 * | 1/2015 | Zuo | ........................ | B60G 17/06 290/1 R |
| 8,970,072 B2 * | 3/2015 | Headstrom | .......... | A61C 17/221 310/15 |
| 9,457,635 B2 * | 10/2016 | Pepka | ..................... | F16F 6/005 |
| 2007/0175716 A1 * | 8/2007 | Kim | ....................... | B60G 13/14 188/267 |
| 2008/0023278 A1 * | 1/2008 | Wereley | ................ | F16F 9/3415 188/267.2 |
| 2012/0061893 A1 * | 3/2012 | Hochberg | ................ | F03G 7/08 267/195 |
| 2012/0193179 A1 * | 8/2012 | Gysen | .................... | B60G 11/00 188/267 |
| 2013/0216351 A1 * | 8/2013 | Griffin | ................... | F01D 25/06 415/1 |
| 2015/0231942 A1 * | 8/2015 | Trangbaek | ............. | F16F 15/03 267/195 |

FOREIGN PATENT DOCUMENTS

WO      WO 01/02198 A1      1/2001
WO      WO 02/091552 A2     11/2002

OTHER PUBLICATIONS

MOOG CSA Engineering, Tuned Mass Dampers M-Series Resonant Device, http://www.moog.com/literature/Space_Defense/Vibration_Control/MoogCSA_TMDmseries, 4 pages, printed from the World Wide Web on Oct. 17, 2017.
Extended European Search Report issued in co-pending European Patent Application No. EP 18210892.8, European Patent Office, dated May 8, 2019, 8 pages.

* cited by examiner

Fields Opposed
Note large magnitude bump between magnets

Fields Aligned
Note low magnitude bump at magnet ends

SYSTEMS AND METHODS FOR DAMPENING DYNAMIC LOADING

FIELD

The present disclosure relates generally to a system for dampening dynamic loading, and more particularly to, a system having a non-ferrous metal body attached to a second body and a stack of magnets attached to a third body, wherein the stack of magnets is movably disposed within or around the non-ferrous metal body and wherein adjacent magnets are arranged in an opposed polar relationship, whereby relative movement of said second and third bodies is damped.

BACKGROUND

Equipment or payload attached to moving vehicles (e.g., helicopters, airplanes, space vehicles, ships, ground vehicles, etc.) often experience dynamic loading. For instance, the equipment or payload may experience severe and random vibrational loading. Reducing or eliminating this dynamic loading is a challenging design consideration when integrating equipment or payload onto vehicles. One conventional approach for reducing or eliminating dynamic loading is making the equipment or payload stiff and strong enough to withstand the dynamic loading. Another conventional approach for reducing or eliminating dynamic loading is mechanically isolating the equipment or payload using a shock absorber, such as a spring suspension.

The conventional approaches for reducing or eliminating dynamic loading, however, have numerous drawbacks. For instance, making the equipment or payload stiff and strong enough to withstand the dynamic loading often substantially increases the weight of the vehicle. Further, traditional shock absorbers such as spring suspensions include preloaded springs and/or fluid energy absorbers, both of which have numerous drawbacks. For instance, preloading a spring not only takes away margin from the spring material, but preloaded springs are also prone to substantial wear over time. Another drawback is that preloaded springs behave differently at low amplitudes versus high amplitudes. An example drawback of fluid energy absorbers is that they display temperature sensitivity and thus suspensions with fluid energy absorbers will behave differently at different temperatures. Yet another drawback is that fluid energy absorbers can leak.

In view of the foregoing, there is a need for improved systems and methods for reducing or eliminating dynamic loading. Particularly, there is a need for systems and methods for reducing or eliminating dynamic loading that do not involve use of preloaded springs or fluid energy absorbers. There is also a need for systems and methods for reducing or eliminating dynamic loading that are both less prone to wear and less temperature dependent than conventional approaches for reducing or eliminating dynamic loading. There is also a need for systems and methods for reducing or eliminating dynamic loading that behave the same or substantially the same at different amplitudes.

SUMMARY

In one example, a dampening system is described. The dampening system includes a non-ferrous metal body attached to a second body and a stack of magnets attached to a third body. The stack of magnets is movably disposed within or around the non-ferrous metal body and adjacent magnets are arranged in an opposed polar relationship, whereby relative movement of said second and third bodies is damped.

Within examples, the non-ferrous metal body radially surrounds the stack of magnets.

Within examples, the non-ferrous metal body comprises a copper tube or aluminum tube surrounding the stack of magnets.

Within examples, the stack of magnets radially surrounds the non-ferrous metal body.

Within examples, the dampening system further comprises a spring coupled to the stack of magnets and the non-ferrous metal body, wherein the spring radially surrounds the stack of magnets and the non-ferrous metal body.

Within examples, the stack of magnets is connected to a first end of the spring and the non-ferrous metal body is connected to a second end of the spring.

Within examples, the dampening system further comprises a first component and a second component to ensure substantially linear motion of the spring, wherein the first component is connected to the first end of the spring, and wherein the second component is connected to the second end of the spring.

Within examples, the first and second components comprise spherical bearings.

Within examples, the dampening system further includes a protective cover encapsulating the spring, the stack of magnets, and the non-ferrous metal body.

Within examples, the spring is a machined spring that exhibits substantially linear behavior between a threshold high amplitude and a threshold low amplitude.

Within examples, the non-ferrous metal body and the stack of magnets are radially spaced apart from one another such that axial movement relative to one another provides air dampening.

Within examples, the dampening system further comprises a flexible porous material disposed between the stack of magnets and the non-ferrous metal body to provide air dampening.

In another example, a system is described that includes a payload attached to a frame of a vehicle and a suspension disposed between the payload and the frame. The suspension comprises a plurality of dampening systems. Each dampening system comprises: (i) a non-ferrous metal body attached to either the payload or the frame; and (ii) a stack of magnets attached to the other of the payload or the frame, wherein the stack is movably disposed within or around the non-ferrous metal body and wherein adjacent magnets are arranged in an opposed polar relationship, whereby relative movement of the payload and the frame is damped.

Within examples, each dampening system further comprises a spring coupled to the stack of magnets and the non-ferrous metal body, wherein the spring radially surrounds the stack of magnets and the non-ferrous metal body.

Within examples, each dampening system further includes a protective cover encapsulating the spring, the stack of magnets, and the non-ferrous metal body.

Within examples, for each dampening system, the non-ferrous metal body and the stack of magnets are radially spaced apart from one another such that axial movement relative to one another provides air dampening.

Various examples of the system(s) described herein may include any of the components, features, and functionalities of any of the other examples of the system(s) described herein in any combination.

In another example, a method of dampening dynamic loading on a payload attached to a vehicle is described. The method includes arranging a plurality of magnets along an axis to form a stack of magnets with at least one pair of magnets having an opposed polar relationship along the axis. The method further includes axially moving the stack of magnets relative to a non-ferrous metal body, so as to dampen dynamic loading of the payload attached to the vehicle.

Within examples, the method also includes: (i) coupling a first end of a spring to the payload; (ii) coupling a second end of the spring to the vehicle; (iii) coupling the stack of magnets to either the first end or the second end of the spring; and (iv) coupling the non-ferrous metal body to the other of the first end or the second end of the spring.

Within examples, the method includes radially surrounding the stack of magnets and the non-ferrous metal body with the spring.

Within examples, the method includes radially surrounding the non-ferrous metal body with the stack of magnets or radially surrounding the stack of magnets with the non-ferrous metal body.

Various examples of the method(s) described herein may include any of the components, features, and functionalities of any of the other examples of the method(s) described herein in any combination.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

As mentioned above, current systems and methods for reducing or eliminating dynamic loading have a number of drawbacks. The methods and systems in accordance with the present disclosure beneficially provide improved methods and systems for reducing or eliminating dynamic loading. In one example, a dampening system is described that includes a non-ferrous metal body attached to a second body and a stack of magnets attached to a third body. The stack of magnets is movably disposed within or around the non-ferrous metal body and adjacent magnets are arranged in an opposed polar relationship, so as to dampen relative movement of said second and third bodies. Within examples, the dampening system also includes a spring coupled to the stack of magnets and the non-ferrous metal body. The disclosed dampening system beneficially provides an improved system for reducing or eliminating dynamic loading that does not involve use of a preloaded spring or a fluid energy absorber. The disclosed dampening system is less prone to wear and less temperature dependent than current systems and methods for reducing or eliminating dynamic loading.

Figure 1A:
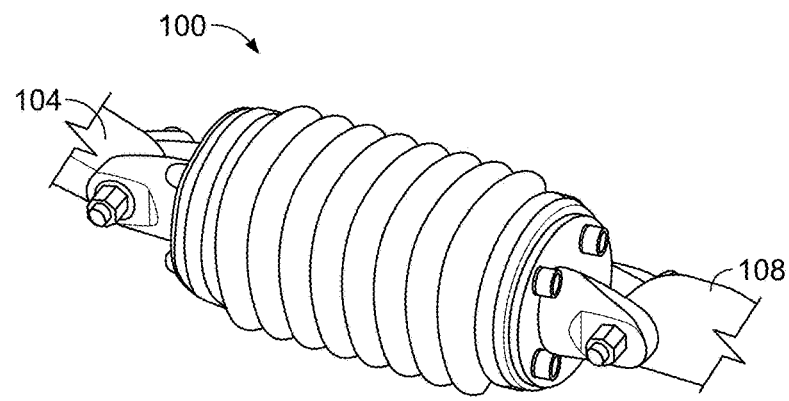
FIG. 1A illustrates a perspective view of a dampening system, according to an example implementation.
Figure 1B:
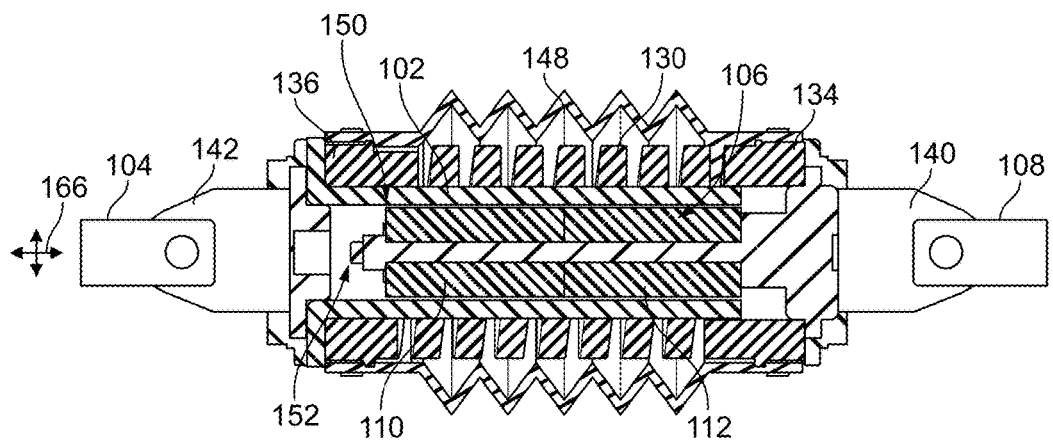
FIG. 1B illustrates a cross-sectional view of the dampening system of FIG. 1A, according to an example implementation.

Referring now to FIGS. 1A-B, a dampening system 100 is illustrated, according to an example implementation. As shown in FIG. 1B, dampening system 100 includes a non-ferrous metal body 102 attached to a second body 104, and a stack of magnets 106 attached to a third body 108. The stack of magnets 106 is movably disposed within the non-ferrous metal body 102. In particular, the non-ferrous metal body 102 radially surrounds the stack of magnets 106 and is axially movable relative to the stack of magnets 106. Within examples, the non-ferrous metal body 102 is a tube surrounding the stack of magnets 106. Non-ferrous metal body 102 may be made from any suitable non-ferrous material. Within examples, the non-ferrous metal body 102 comprises copper or aluminum.

Although in the example of FIGS. 1A-B the stack of magnets 106 is movably disposed within the non-ferrous metal body 102, in other examples the stack of magnets 106 is movably disposed around the non-ferrous metal body 102.

Figure 2:
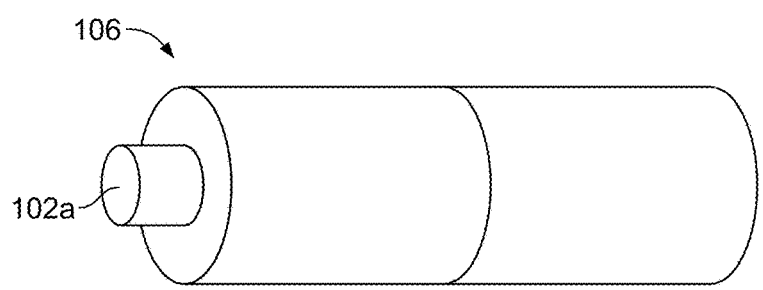
FIG. 2 illustrates a perspective view of an example non-ferrous body and stack of magnets, according to an example implementation.

Within examples, the stack of magnets 106 radially surrounds the non-ferrous metal body 102. For instance, FIG. 2 illustrates the stack of magnets 106 being movably disposed around non-ferrous metal body 102a. In this example, the non-ferrous metal body 102a comprises a metal rod that is movable within the stack of magnets 106.

Returning to FIG. 1B, the stack of magnets 106 includes magnets 110 and 112 that are arranged in an opposed polar relationship. The magnets 110, 112 are ring-shaped magnets; however, other suitable shapes of magnets are possible as well. Further, although the stack of magnets 106 in dampening system 100 includes two magnets, in other examples, the stack of magnets includes more than two magnets, where adjacent magnets of the more than two magnets are arranged in an opposed polar relationship.

Magnets 110 and 112 may be made from any suitable magnetic material. Within examples, the magnets 110 and 112 comprise rare-earth magnets (i.e., strong permanent magnets made from alloys of rare-earth elements, such as elements in the lanthanide series, plus scandium and yttrium).

For one reason or another, second body 104 and third body 108 may experience dynamic loading (e.g., vibrational loading) that causes the two bodies 104, 108 to move relative to one another. Within examples, one of the second body 104 and third body 108 is a piece of equipment or payload, and the other of the second body 104 and third body 108 is a vehicle (e.g., helicopter, airplane, space vehicle, ship, ground vehicle, etc.). Other example bodies are possible as well. In general, the second body 104 and the third body 108 may be any bodies for which dampened relative movement between each other is desired.

When second body 104 and third body 108 move relative to one another, this movement in turn will cause non-ferrous metal body 102 to move relative to the stack of magnets 106. Further, the movement of non-ferrous metal body 102 relative to the stack of magnets 106 acts to dampen relative movement of second body 104 and third body 108 due changing electric and magnetic fields. In particular, according to Lenz's Law, when a magnet (e.g., stack of magnets 106) moves near a conductor (e.g., the non-ferrous metal body 102), a current will be induced to flow in the conductor and this current will follow a path that will create a second magnetic field oriented to resist changes in the original magnetic field. If the magnetic field strength is increasing, the current will flow in a way that will produce a magnetic field opposed to the first magnetic field in an attempt to cancel its increasing flux. If the magnetic field is decreasing, the current will flow in the opposite direction so that its associated magnetic field reinforces the first magnetic field in an attempt to prevent it from decreasing. This electromagnetic phenomenon acts to slow the motion of the non-ferrous metal body 102 relative to the stack of magnets 106, which in turn acts to dampen relative movement of second body 104 and third body 108.

The disclosed arrangement of adjacent magnets in an opposed polar relationship provides an enhanced dampening effect compared to known systems that include a non-ferrous body moving relative to a stack of magnets. For example, voice coil actuators with magnetic dashpots include a permanent magnet and conductive component (e.g., a coil winding) to produce a force that is proportional to the current applied to the conductive component. Such magnetic dashpots in voice coil actuators may achieve some dampening with a large enough magnet and a conductive component. However, since these conventional magnetic dashpots act as a voice coil actuator, the system requires a large static magnetic field in a single direction. In order to achieve the large static magnetic field in a single direction, these magnetic dashpots include a single magnet or a stack of magnets having an aligned polar relationship. The disclosed arrangement of adjacent magnets in an opposed polar relationship provides an enhanced dampening effect compared to the existing systems having an arrangement of adjacent magnets having an aligned polar relationship.

Figure 3A:
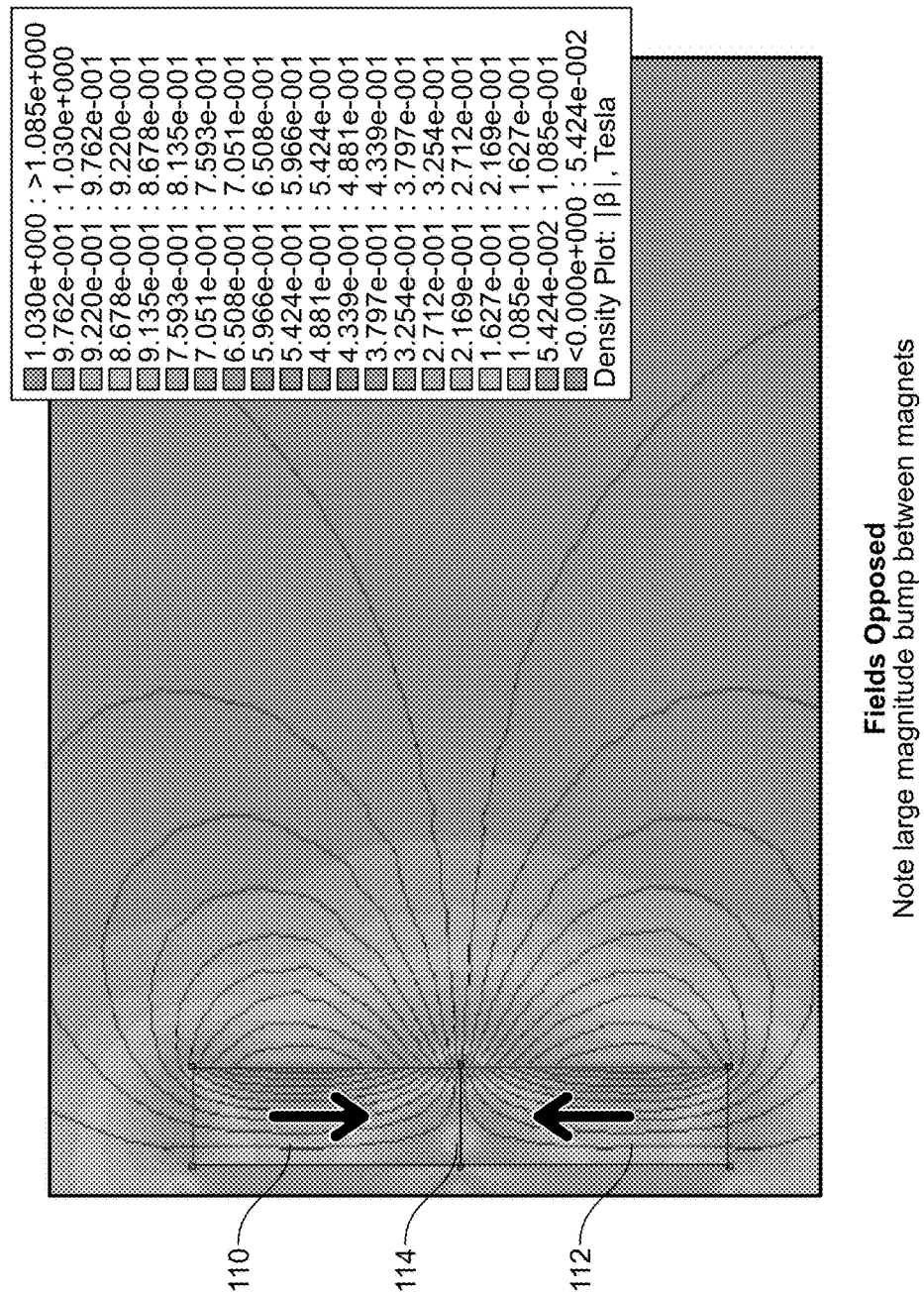
FIG. 3A illustrates an example magnetic field of a stack of magnets wherein adjacent magnets are arranged in an opposed polar relationship, according to an example implementation.
Figure 3B:
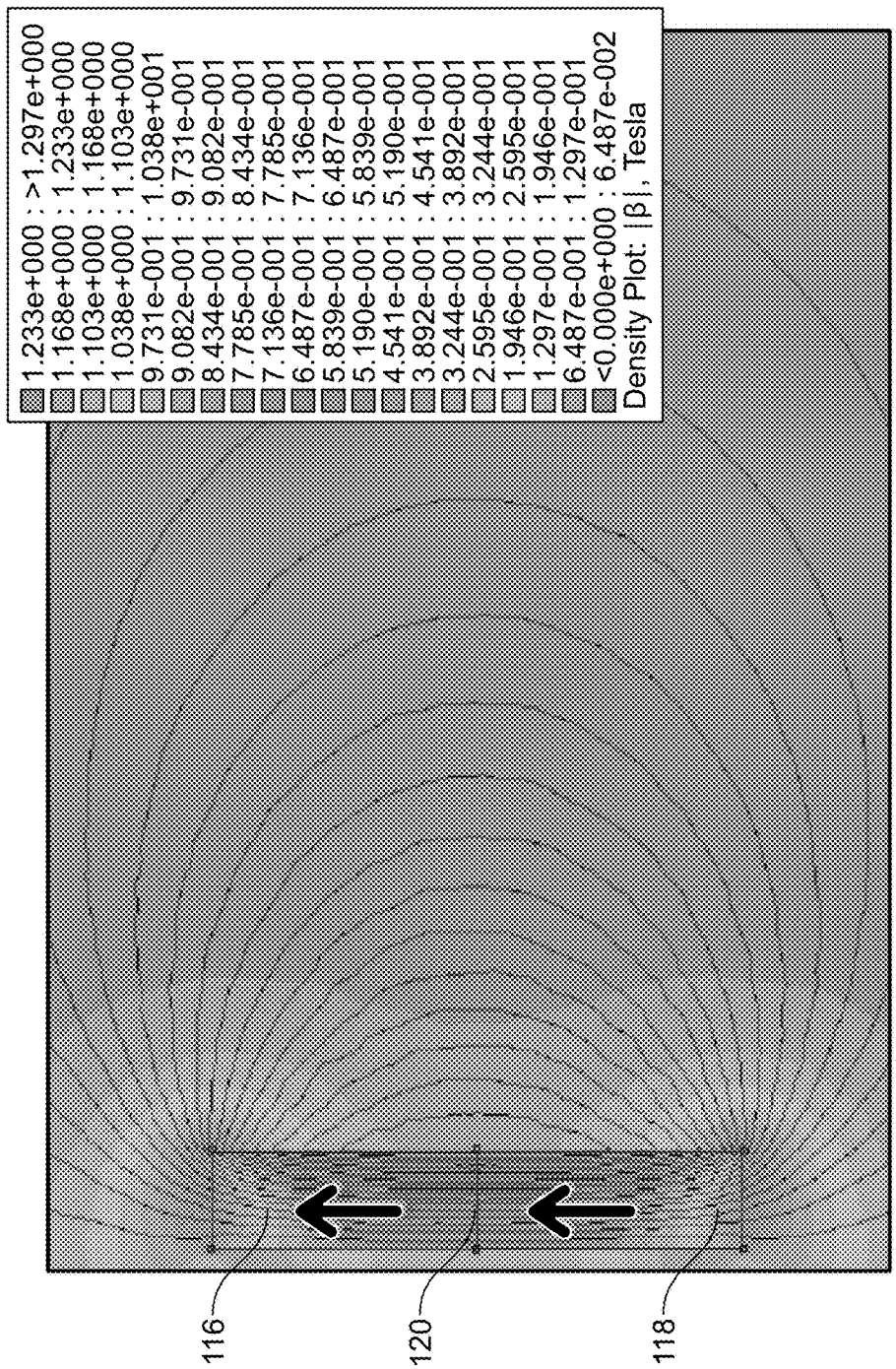
FIG. 3B illustrates an example magnetic field of a stack of magnets wherein adjacent magnets are arranged in an aligned polar relationship, according to an example implementation.

The enhanced dampening effect is provided by this arrangement because the opposed polar relationship leads to increased local field interactions with the non-ferrous metal body 102, which in turn cause more dampening. An example of the increased local field interactions is illustrated in FIGS. 3A and 3B. In particular, FIG. 3A illustrates an analytical field prediction of two 0.5" diameter, 0.5" tall ring magnets arranged in an opposed polar relationship, whereas FIG. 3B illustrates an analytical field prediction of two 0.5" diameter, 0.5" tall ring magnets arranged in an aligned polar relationship.

As shown in FIG. 3A, the opposed polar relationship of magnets 110, 112 includes the north poles of the magnets 110, 112 adjacent to one another at interface 114. However, in other examples, the opposed polar relationship of magnets 110, 112 includes the south poles of the magnets 110, 112 adjacent to one another at interface 114. Further, as shown in FIG. 3B, the aligned polar relationship includes the south pole of magnet 116 adjacent to the north pole of magnet 118 adjacent to each other at interface 120. However, in other examples, the aligned polar relationship includes the north pole of magnet 116 adjacent to the south pole of magnet 118 at interface 120.

As is evident by comparing FIGS. 3A and 3B, the arrangement of adjacent magnets in an opposed polar relationship greatly reduces the overall field strength of the stack of magnets but greatly increases local field interactions with the non-ferrous metal body 102. More particularly, the magnetic field intensity at the interface 114 between opposed magnets 110, 112 is much larger than the magnetic field intensity at the interface 120 of the aligned magnets 116, 118. The large field intensity (or intensities) at the interface(s) between magnets an opposed polar relationship interacts with the nearby conductor creating a much more efficient loss mechanism and much more damping in the dampening system 100 than a system with magnets having an aligned polar relationship.

Returning to FIG. 1B, dampening system 100 also includes a spring 130 coupled to the stack of magnets 106 and the non-ferrous metal body 102. The spring 130 radially surrounds both the stack of magnets 106 and the non-ferrous metal body 102. The stack of magnets 106 is connected to a first end 134 of the spring and the non-ferrous metal body 102 is connected to a second end 136 of the spring. Within examples, the spring 130 is a machined spring that is designed to operate with a tension load (e.g., the spring stretches as the tension load is applied to it) as well as with a compression load (e.g., the spring compresses as the compression load is applied to it). Spring 130 may be made from any suitable material. Within examples, the spring 130 comprises a high strength stainless steel that provides high strength, toughness, ductility and corrosion resistance. Example high strength stainless steel includes MP35N® stainless steel, Custom 455® stainless steel, and Custom 465® stainless steel. Other example materials are possible as well, including but not limited to maraging steel and Inconel alloys.

Since the stack of magnets 106 is connected to the first end 134 of the spring 130 and the non-ferrous metal body 102 is connected to the second end 136 of the spring 130, the non-ferrous metal body 102 will move relative to the stack of magnets 106 during both tension and compression of the spring 130. This relative movement helps to dampen the movement of the spring 130 during both tension and compression of the spring.

Figure 4:
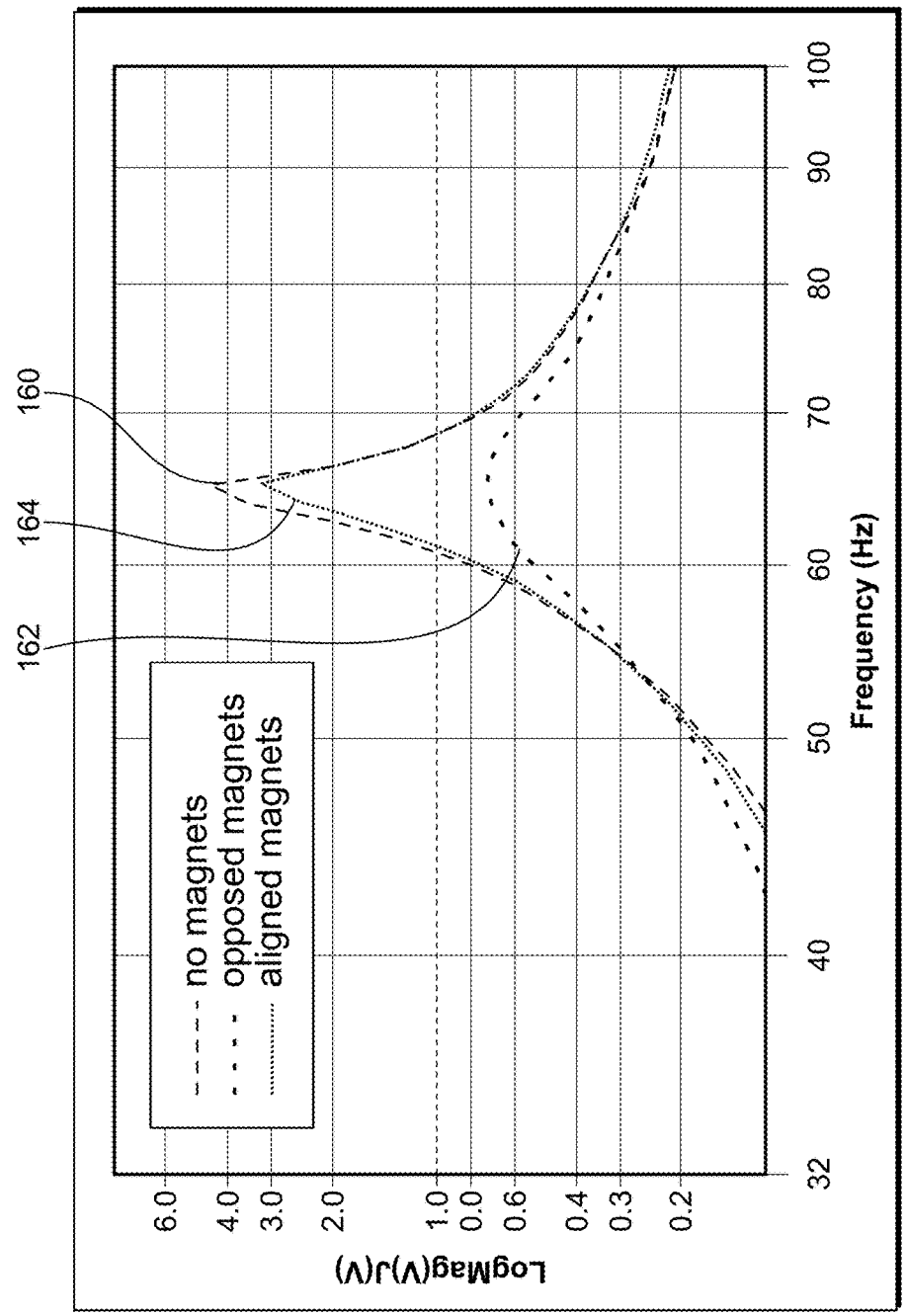
FIG. 4 illustrates a graph illustrating (i) an example measured transfer function for a dampening system with no magnet stack, (ii) an example measured transfer function for a dampening system with a stack of magnets wherein adjacent magnets are arranged in an opposed polar relationship, and (iii) an example measured transfer function for a dampening system with a stack of magnets wherein adjacent magnets are arranged in an aligned polar relationship, according to an example implementation.

FIG. 4 illustrates example spring mass resonances for springs attached to magnetic stacks with aligned and opposing magnetic fields by measuring the transfer function between an accelerometer on the mass and a collocated excitation with a hammer. The response of a spring not attached to any magnets is also shown. In particular, FIG. 4 illustrates a graph illustrating (i) an example measured transfer function 160 for a dampening system with no magnet stack, (ii) an example measured transfer function 162 for a dampening system with a stack of magnets wherein adjacent magnets are arranged in an opposed polar relationship, and (iii) an example measured transfer function 164 for a dampening system with a stack of magnets wherein adjacent magnets are arranged in an aligned polar relationship.

As is evident from FIG. 4, the dampening system with a stack of magnets wherein adjacent magnets are arranged in an opposed polar relationship absorbs much more energy than the dampening system with a stack of magnets wherein adjacent magnets are arranged in an aligned polar relationship. In this particular example, the difference in measured damping ratio shows the opposed magnets are 14 times more effective than the aligned magnets, with the aligned magnets increasing the damping ratio from 1% to 1.5% and the opposed magnets substantially increasing the damping ratio to 8%.

Returning to FIG. 1B, the dampening system 100 also includes a first component 140 and a second component 142 to ensure substantially linear motion of the spring 130. The first component 140 is connected to the first end 134 of the spring 130, and the second component 142 is connected to the second end 136 of the spring 130. These components act as moment release boundaries on the ends of the spring 130, which help to ensure that the non-ferrous metal body 102 only moves axially with respect to the magnets. More particularly, the first and second components 140, 142 limit or prevent movement other that axial movement (e.g., bending or rotation) from acting on the spring 130. In an example the first and second components 140, 142 comprise spherical bearings. In another example, the first and second components 140, 142 are engineered flexures that are stiff axially but flexible in rotation. The substantially linear motion of the spring 130 helps to provide a consistent and predictable level of dampening for dampening system 100.

As used herein, substantially linear motion of the spring 130 indicates that the motion of the spring along axis 166 (see FIG. 1B) follows a linear path and does not deviate from the linear path more than a threshold amount. In an example, the threshold amount is between about +/−0.001 and 0.005 inches. However, in other example embodiments, the threshold could be greater, such as a threshold between about +/−0.005 and 0.010 inches. In other examples, the threshold could be greater than about 0.010 inches. Other examples are possible as well. In an example, the threshold is dependent on spring stiffness and loading.

As mentioned above, the non-ferrous metal body 102 is attached to the second body 104 and the stack of magnets 106 is attached to third body 108. The non-ferrous metal body 102 may be attached to the second body 104 and the stack of magnets 106 may be attached to third body 108 in any suitable manner. Within examples, the non-ferrous metal body 102 is attached to the second body 104 through other components, and the stack of magnets 106 is attached to the third body 108 through other components. For instance, within examples, the non-ferrous metal body 102 is bolted to second component 142, and the second component 142 is bolted to second body 104. Further, within examples, the stack of magnets 106 is bolted to first component 140, and the first component 140 is bolted to third body 108. These components may be attached to one another in other ways, including but not limited to being joined together with any suitable fastener (e.g., bolts, rivets, nuts, and/or nails), via welding, and/or with an adhesive.

Within examples, the non-ferrous metal body 102 is attached directly to the second body 104, and the stack of magnets 106 is attached directly to the third body 108. These components may be directly attached to one another in any suitable way, including but not limited to being joined together with any suitable fastener (e.g., bolts, rivets, nuts, and/or nails), via welding, and/or with an adhesive.

The first and second ends 134, 136 of spring 130 may be attached to the non-ferrous metal body 102 and the stack of magnets 106 in a similar manner. More particularly, these components may be attached to one another in any suitable way, including but not limited to being joined together with any suitable fastener (e.g., bolts, rivets, nuts, and/or nails), via welding, and/or with an adhesive.

The dampening system 100 also includes a protective cover 148 encapsulating the spring 130, the stack of magnets 106, and the non-ferrous metal body 102. Encapsulating the spring 130, the stack of magnets 106, and the non-ferrous metal body 102 with the protective cover 148 helps to protect the dampening system 100 from environmental considerations, such as air, rain, sand, etc. Further, the protective cover 148 may include bleed paths (e.g., holes, slots or gaps) that provide a pathway for venting, so as to allow the dampening system 100 to vent as the dampening system 100 experience altitude changes. The protective cover 148 may be made from any suitable material. Within examples, the protective cover comprises an elastomer (e.g., rubber, neoprene, silicone, etc.).

In addition to providing dampening with the stack of magnets 106 movably disposed within or around the non-ferrous metal body 102, the dampening system 100 may be configured to provide additional dampening. Within examples, the non-ferrous metal body 102 and the stack of magnets 106 are radially spaced apart from one another such that axial movement relative to one another provides air dampening. For instance, with reference to FIG. 1B, the spacing 150 between the non-ferrous metal body 102 and the stack of magnets 106 is relatively small, which creates the opportunity for air damping as air is pushed in and out of the volume at the proximal end 152 of the stack of magnets 106. The air being compressed and expanded at the proximal end 152 of the stack of magnets 106 due to the axial movement of the stack of magnets 106 creates a suction force that further dampens the relative movement between second body 104 and third body 108. In an example embodiment, the non-ferrous metal body 102 and the stack of magnets 106 are radially spaced apart by about 0.01-0.015 inches. In other examples, the spacing could be less than about 0.01 inches. In yet other examples, the spacing could be greater than about 0.015 inches. In general, the spacing can be tailored to provide the damping desired by a particular application.

Figure 5:
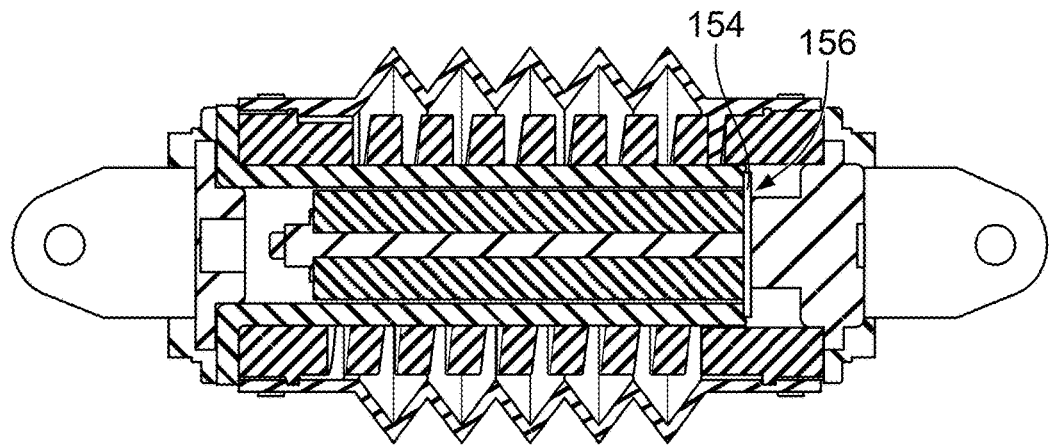
FIG. 5 illustrates a cross-sectional view of a dampening system, according to an example implementation.

Within examples, the dampening system 100 further includes a flexible porous material disposed between the stack of magnets 106 and the non-ferrous metal body 102 to provide additional air dampening. For instance, FIG. 5 illustrates flexible porous material 154 added to the distal end 156 of the magnet stack 106 to create additional air damping. In an example, the porous material comprises a microporous material (having pore diameters of less than 2 nm), a mesoporous material (having pore diameters between 2 nm and 50 nm), or a macroporous materials (having pore diameters of greater than 50 nm). The size of the pores in the porous material may be selected based on the desired air dampening to be provided by the flexible porous material.

Within examples, the properties of at least one of the spring 130, the stack of magnets 106, or the non-ferrous metal body 102 are selected so as to provide a desired level of dampening of the relative movement between the bodies 104, 108. For instance, the number of magnets in the stack of magnets 106 affects the magnitude of dampening provided by the dampening system 100. Thus, within examples, the number of magnets can be selected based on the desired dampening. Further, the strength of the magnets in the stack of magnets 106 affects the magnitude of dampening provided by the dampening system 100. Thus, within examples, the strength of the magnets can be selected based on the desired dampening. Within examples, the magnets in the stack of magnets have a lifting force on the order of about 10 lbs. For instance, within examples, the magnets in the stack of magnets have a lifting force between 5 and 15 lbs. Other examples are possible as well. In general, the strength of the magnets can be selected so as to provide the damping desired by a particular application.

Still further, the amount of spacing 150 affects the level of air dampening provided by the dampening system 100. Thus, within examples, the shape and size of the stack of magnets 106 and non-ferrous metal body 102 can be adjusted to provide an amount of spacing that achieves a desired level of air dampening.

In an example, the structural properties of the spring 130 are selected to minimize non-linear behavior between high and low amplitudes. In other words, the structural properties of the spring 130 are selected such that the spring exhibits substantially linear behavior between a threshold high amplitude and a threshold low amplitude. This helps to ensure that the dampening system 100 performs the same or substantially the same at both high and low amplitudes. Within examples, the threshold low amplitude is 0.001 inches and the threshold high amplitude is 0.25 inches. Other threshold low amplitudes and threshold high amplitudes are possible as well. In general, the threshold high amplitude and the threshold low amplitude can be selected so as to provide substantially linear behavior across high and low amplitudes for a particular application.

In another example, the structural properties of at least one of the spring 130, the stack of magnets 106, or the non-ferrous metal body 102 are selected so as to provide different levels of dampening for different frequencies of motion.

Figure 6:
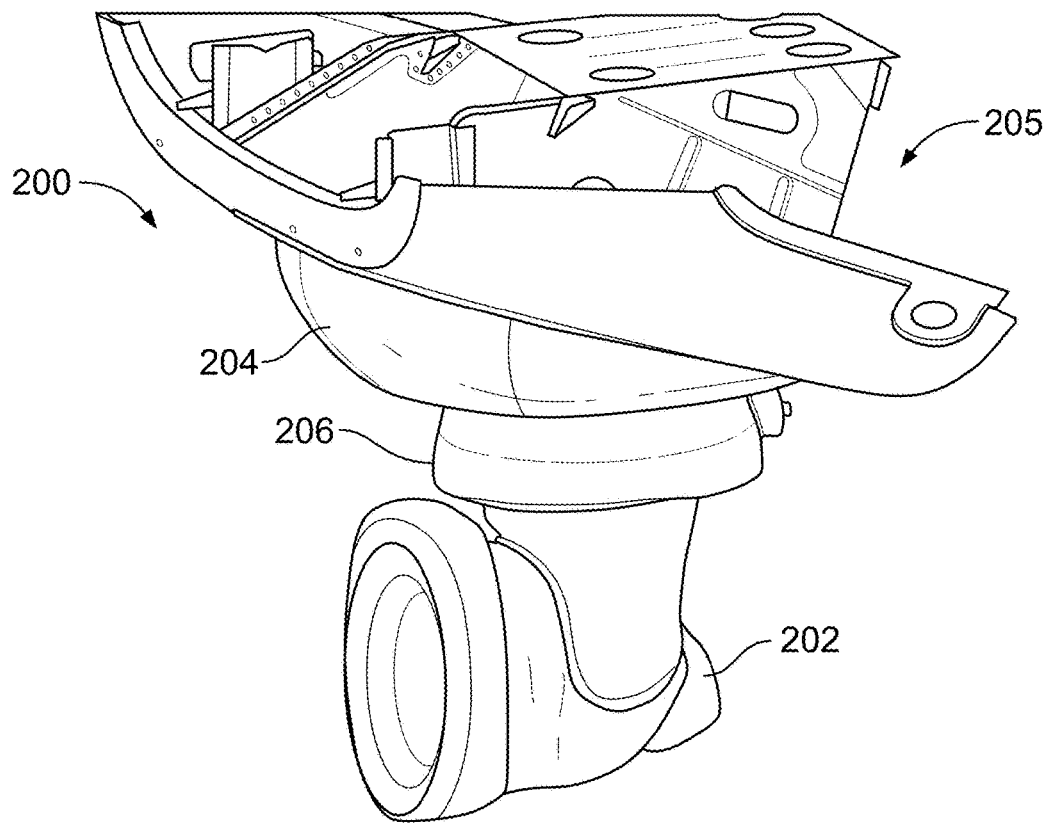
FIG. 6 illustrates a perspective view of a system, according to an example implementation.
Figure 7:
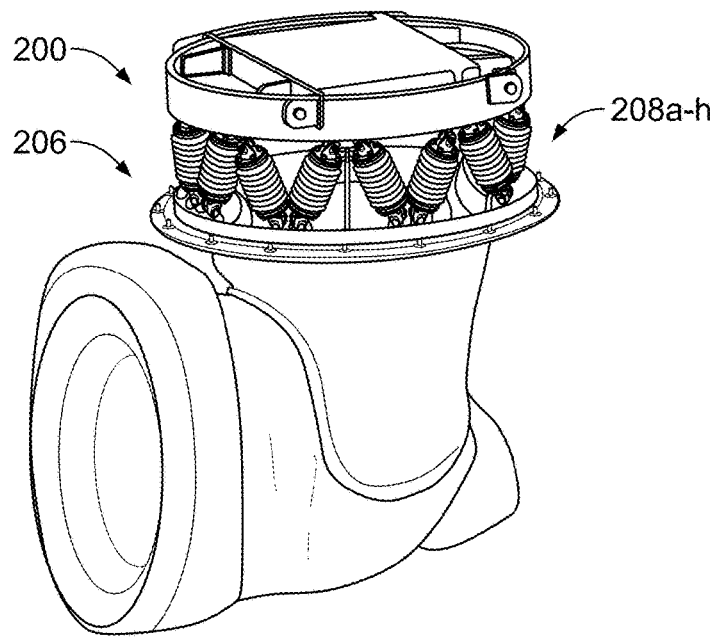
FIG. 7 illustrates a perspective view of some components of the system of FIG. 6, according to an example implementation.

FIGS. 6-7 illustrate a system 200, according to an example implementation. The system 200 includes a payload 202 attached to a frame 204 of a vehicle 205. The system 200 also includes a suspension 206 disposed between the payload 202 and the frame 204. As seen in FIG. 7, the suspension 206 (depicted without its cover plate) includes a plurality of dampening systems 208a-h. Within examples, dampening systems 208a-h are each the same as or similar to dampening system 100 of FIGS. 1A-B. For instance, each dampening system 208a-h includes the non-ferrous metal body 102 attached to either the payload 202 or the frame 204. Further, each dampening system 208a-h includes the stack of magnets 106 attached to the other of the payload 202 or the frame 204. The stack of magnets 106 is movably disposed within or around the non-ferrous metal body 102 and adjacent magnets in the stack of magnets 106 are arranged in an opposed polar relationship, whereby relative movement of the payload 202 and the frame 204 is damped.

In the example of FIGS. 6-7, the vehicle 205 is a helicopter and the payload 202 is an infrared light-emitting diode searchlight. The suspension 206 including the plurality of dampening systems 208a-h acts to dampen relative movement between the helicopter and the infrared light-emitting diode searchlight (e.g., relative movement caused by vibrational loading). Other example payloads and vehicles are possible as well. In general, the payload and vehicle may be any payload and vehicle combination for which dampened relative motion between the payload and vehicle is desired. The dampened relative motion may provide load-mitigation stability and/or pointing stability for the payload attached to the vehicle. Within examples, the payload is an optical system such as a telescope or a camera, and the vehicle is a helicopter, airplane, space vehicle, ship, or ground vessel.

Figure 8:
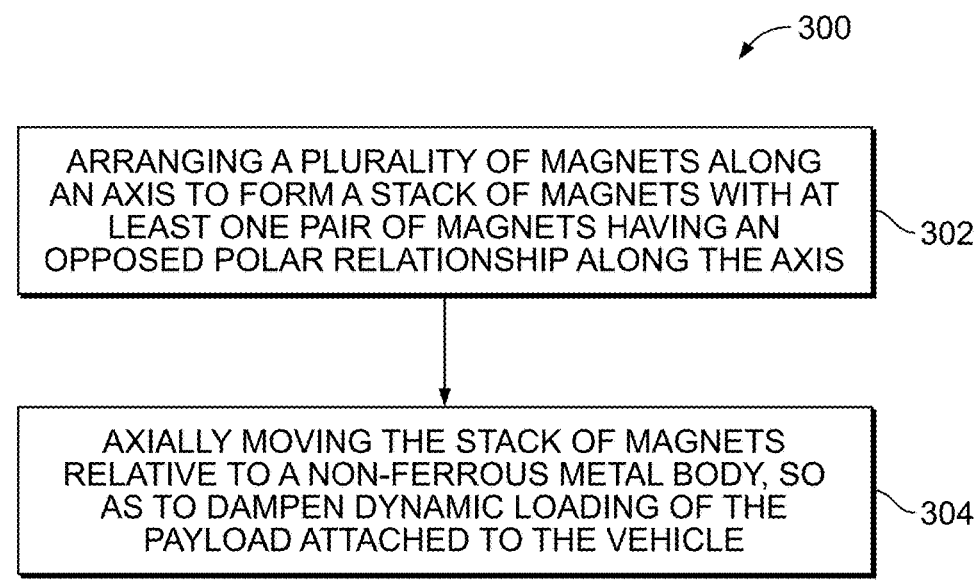
FIG. 8 shows a flowchart of an example method of dampening dynamic loading on a payload attached to a vehicle, according to an example implementation.

FIG. 8 shows a flowchart of an example method 300 of dampening dynamic loading on a payload attached to a vehicle, according to an example implementation. Method 300 shown in FIG. 8 presents an example of a method that could be used with the dampening system 100 shown in FIGS. 1A-B and/or the system 200 shown in FIGS. 6-7, for example. In some instances, components of the disclosed systems may be configured to perform the functions such that the components are actually configured and structured to enable such performance. In other examples, components of the disclosed systems may be arranged to be adapted to, capable of, or suited for performing the functions, such as when operated in a specific manner. Method 300 may include one or more operations, functions, or actions as illustrated by one or more of blocks 302-304. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 302, the method 300 includes arranging a plurality of magnets (e.g., magnets 110, 112) along an axis (e.g., x-axis 166 shown in FIG. 1B) to form a stack of magnets 106 with at least one pair of magnets (e.g., the pair of magnets 110 and 112) having an opposed polar relationship along the axis 166. At block 304, the method 300 includes axially moving the stack of magnets 106 relative to a non-ferrous metal body 102, so as to dampen dynamic loading of the payload 202 attached to the vehicle 205.

Figures 9, 10, 11:
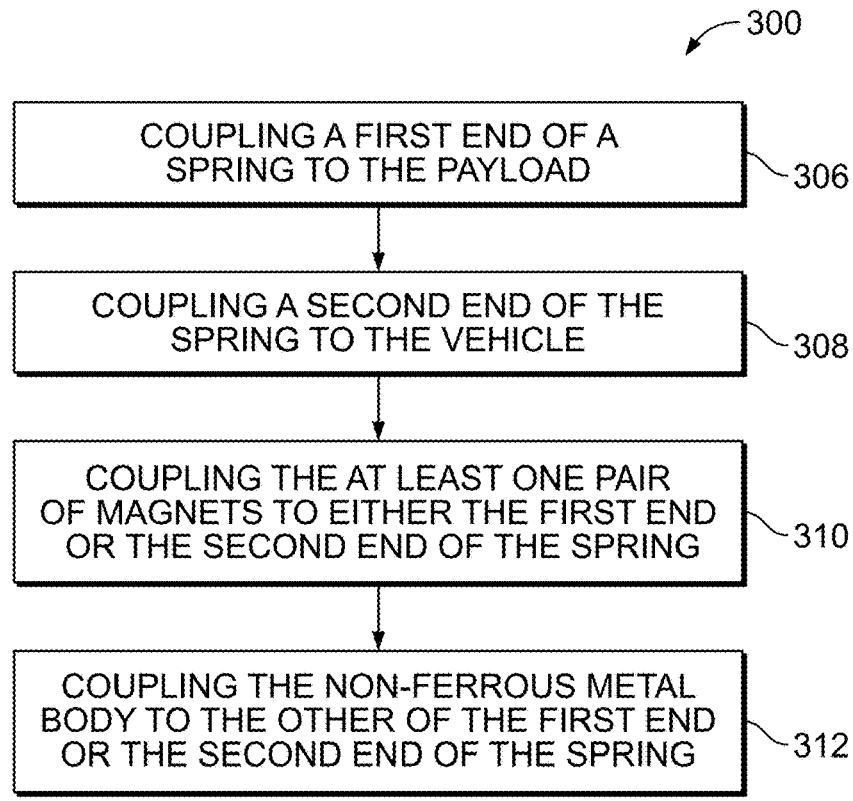
FIG. 9 shows a flowchart of an example method for use with the method in FIG. 8, according to an example implementation.
FIG. 10 shows a flowchart of another example method for use with the method in FIG. 8, according to an example implementation.
FIG. 11 shows a flowchart of another example method for use with the method in FIG. 8, according to an example implementation.

FIG. 9 shows a flowchart of an example method for use with the method 300, according to an example implementation. At block 306, the method 300 includes coupling the first end 134 of spring 130 to the payload 202. At block 308, the method 300 includes coupling the second end 136 of the spring 130 to the vehicle 205. At block 310, the method 300 includes coupling the stack of magnets 106 to either the first end 134 or the second end 136 of the spring 130. At block 312, the method 300 includes coupling the non-ferrous metal body 102 to the other of the first end 134 or the second end 136 of the spring 130.

FIG. 10 shows a flowchart of another example method for use with the method 300, according to an example implementation. At block 314, the method 300 includes radially surrounding the stack of magnets 106 and the non-ferrous metal body 102 with the spring 130.

FIG. 11 shows a flowchart of another example method for use with the method in FIG. 8, according to an example implementation. At block 316, the method 300 includes radially surrounding the non-ferrous metal body 102 with the stack of magnets 106 or radially surrounding the stack of magnets 106 with the non-ferrous metal body 102.

Example systems and method described herein provide improved systems and methods for reducing or eliminating dynamic loading. Since the disclosed dampening systems and methods do not involve use of a preloaded spring or fluid energy absorbers, the disclosed dampening systems and methods are less prone to wear and less temperature dependent than conventional systems and methods for reducing or eliminating dynamic loading. In particular, the machined spring of the disclosed dampening system is less prone to wear than preloaded springs of conventional systems and methods. Further, the components of the disclosed dampening system are nearly temperature insensitive, and thus the disclosed dampening system operates the same or substantially the same at different temperatures.

As mentioned above, preloaded springs of conventional systems and methods for reducing or eliminating dynamic loading also behave differently at low amplitudes than at high amplitudes. Beneficially, the disclosed dampening system can be designed so as to behave the same or substantially the same at high and low amplitudes. This allows the disclosed dampening system to provide a more consistent and predictable level of dampening compared to conventional systems and methods.

The disclosed dampening systems and method also involve a stack of magnets wherein adjacent magnets in an opposed polar relationship. This disclosed arrangement of adjacent magnets in an opposed polar relationship provides an enhanced dampening effect compared to known systems that include a non-ferrous body moving relative to a stack of magnets.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s) and method(s) disclosed herein include a variety of components, features, and functionalities. It should be understood that the various examples of the system(s) and method(s) disclosed herein may include any of the components, features, and functionalities of any of the other examples of the system(s) and method(s) disclosed herein in any combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

It is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims.

What is claimed is:

1. A dampening system comprising:
a non-ferrous metal body attached to a second body;
a flexible porous material; and
a stack of magnets attached to a third body, wherein the stack of magnets is movably disposed within or around the non-ferrous metal body, wherein the flexible porous material is disposed between the stack of magnets and the non-ferrous metal body, and wherein adjacent magnets are arranged in an opposed polar relationship, whereby relative movement of said second and third bodies is damped.

2. The dampening system of claim 1, wherein the non-ferrous metal body radially surrounds the stack of magnets.

3. The dampening system of claim 2, wherein the non-ferrous metal body comprises a copper tube or aluminum tube surrounding the stack of magnets.

4. The dampening system of claim 1, wherein the stack of magnets radially surrounds the non-ferrous metal body.

5. The dampening system of claim 1, further comprising:
a spring coupled to the stack of magnets and the non-ferrous metal body, wherein the spring radially surrounds the stack of magnets and the non-ferrous metal body.

6. The dampening system of claim 5, wherein the stack of magnets is connected to a first end of the spring, and wherein the non-ferrous metal body is connected to a second end of the spring.

7. The dampening system of claim 6, further comprising:
a first component and a second component to ensure substantially linear motion of the spring, wherein the first component is connected to the first end of the spring, and wherein the second component is connected to the second end of the spring.

8. The dampening system of claim 5, further comprising a protective cover encapsulating the spring, the stack of magnets, and the non-ferrous metal body.

9. The dampening system of claim 5, wherein the spring is a machined spring that exhibits substantially linear behavior between a threshold high amplitude and a threshold low amplitude.

10. The dampening system of claim 1, wherein the non-ferrous metal body and the stack of magnets are radially spaced apart from one another such that axial movement relative to one another provides air dampening.

11. A system comprising:

a payload attached to a frame of a vehicle; and a suspension disposed between the payload and the frame, the suspension comprising a plurality of dampening systems, wherein each dampening system comprises:

a non-ferrous metal body attached to either the payload or the frame;

a flexible porous material; and a stack of magnets attached to the other of the payload or the frame, wherein the stack is movably disposed within or around the non-ferrous metal body, wherein the flexible porous material is disposed between the stack of magnets and the non-ferrous metal body, and wherein adjacent magnets are arranged in an opposed polar relationship, whereby relative movement of the payload and the frame is damped.

12. The system of claim 11, wherein each dampening system further comprises a spring coupled to the stack of magnets and the non-ferrous metal body, wherein the spring radially surrounds the stack of magnets and the non-ferrous metal body.

13. The system of claim 12, wherein each dampening system further comprises a protective cover encapsulating the spring, the stack of magnets, and the non-ferrous metal body.

14. The system of claim 11, wherein, for each dampening system, the non-ferrous metal body and the stack of magnets are radially spaced apart from one another such that axial movement relative to one another provides air dampening.

15. A method of dampening dynamic loading on a payload attached to a vehicle, the method comprising:

arranging a plurality of magnets along an axis to form a stack of magnets with at least one pair of magnets having an opposed polar relationship along the axis;

disposing a flexible porous material between the stack of magnets and a non-ferrous metal body; and axially moving the stack of magnets relative to the non-ferrous metal body, so as to dampen dynamic loading of the payload attached to the vehicle.

16. The method of claim 15, further comprising:

coupling a first end of a spring to the payload;

coupling a second end of the spring to the vehicle;

coupling the a stack of magnets to either the first end or the second end of the spring; and coupling the non-ferrous metal body to the other of the first end or the second end of the spring.

17. The method of claim 16, further comprising:

radially surrounding the stack of magnets and the non-ferrous metal body with the spring.

18. The method of claim 15, further comprising:

radially surrounding the non-ferrous metal body with the stack of magnets or radially surrounding the stack of magnets with the non-ferrous metal body.

* * * * *